US006623381B2

(12) United States Patent
Sullivan

(10) Patent No.: US 6,623,381 B2
(45) Date of Patent: *Sep. 23, 2003

(54) MULTI-LAYER GOLF BALL

(75) Inventor: Michael J. Sullivan, Barrington, RI (US)

(73) Assignee: The Top-Flite Golf Company, Chicopee, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/080,266

(22) Filed: Feb. 21, 2002

(65) Prior Publication Data

US 2002/0142864 A1 Oct. 3, 2002

Related U.S. Application Data

(63) Continuation of application No. 08/714,661, filed on Sep. 16, 1996, now Pat. No. 6,368,237, which is a division of application No. 08/562,540, filed on Nov. 20, 1995, now abandoned, which is a continuation of application No. 08/070,510, filed on Jun. 1, 1993, now abandoned.

(51) Int. Cl.⁷ ................................................ A63B 37/12
(52) U.S. Cl. ........................................................ 473/374
(58) Field of Search ................................ 473/377, 378, 473/373, 374, 370, 371, 367, 368

(56) References Cited

U.S. PATENT DOCUMENTS

| | | | | |
|---|---|---|---|---|
| 4,431,193 A | * | 2/1984 | Nesbitt | 473/373 |
| 4,650,193 A | | 3/1987 | Molitor et al. | |
| 5,000,459 A | | 3/1991 | Isaac | |
| 5,068,151 A | | 11/1991 | Nakamura | |
| 5,222,739 A | * | 6/1993 | Horiuchi et al. | 473/378 |
| 5,314,187 A | | 5/1994 | Proudfit | |
| 5,334,673 A | * | 8/1994 | Wu | 473/378 |
| 5,387,470 A | * | 2/1995 | Parnell et al. | 426/127 |
| 6,210,293 B1 | * | 4/2001 | Sullivan | 473/374 |
| 6,224,498 B1 | * | 5/2001 | Sullivan | 473/374 |
| 6,368,237 B1 | * | 4/2002 | Sullivan | 473/378 |

* cited by examiner

Primary Examiner—Steven Wong
Assistant Examiner—Raeann Gorden

(57) ABSTRACT

The present invention is directed to an improved multi-layer golf ball comprising a core, an inner cover layer and an outer cover layer. The inner cover layer is comprised of a high acid ionomer or ionomer blend which may or may not include a filler such as zinc-stearate. The outer cover layer is comprised of a soft, very low modulus ionomer or ionomer blend, or a non-ionomeric thermoplastic elastomer such as polyurethane, polyester or polyesteramide. The resulting multi-layered golf ball of the present invention provides for enhanced distance without sacrificing playability or durability when compared to known multi-layer golf balls.

14 Claims, 1 Drawing Sheet

MULTI-LAYER GOLF BALL

This application is a continuation of U.S. application Ser. No. 08/714,661, filed on Sep. 16, 1996 now U.S. Pat. No. 6,368,237, which is a divisional of U.S. application Ser. No. 08/562,540, filed on Nov. 20, 1995, now abandoned, which is a continuation of U.S. application Ser. No. 08/070,510, filed on Jun. 1, 1993, now abandoned.

FIELD OF THE INVENTION

The present invention relates to golf balls and, more particularly, to improved golf balls comprising multi-layer covers which have a hard inner layer and a relatively soft outer layer. The improved multi-layer golf balls provide for enhanced distance and durability properties while at the same time offering the "feel" and spin characteristics associated with soft balata and balata-like covers of the prior art.

BACKGROUND OF THE INVENTION

Traditional golf ball covers have been comprised of balata or blends of balata with elastomeric or plastic materials. The traditional balata covers are relatively soft and flexible. Upon impact, the soft balata covers compress against the surface of the club producing high spin. Consequently, the soft and flexible balata covers provide an experienced golfer with the ability to apply a spin to control the ball in flight in order to produce a draw or a fade, or a backspin which causes the ball to "bite" or stop abruptly on contact with the green. Moreover, the soft balata covers produce a soft "feel" to the low handicap player. Such playability properties (workability, feel, etc.) are particularly important in short iron play with low swing speeds and are exploited significantly by relatively skilled players.

Despite all the benefits of balata, balata covered golf balls are easily cut and/or damaged if mis-hit. Golf balls produced with balata or balata-containing cover compositions therefore have a relatively short lifespan.

As a result of this negative property, balata and its synthetic substitutes, trans-polybutadiene and transpolyisoprene, have been essentially replaced as the cover materials of choice by new cover materials comprising ionomeric resins.

Ionomeric resins are polymers containing interchain ionic bonding. As a result of their toughness, durability and flight characteristics, various ionomeric resins sold by E. I. DuPont de Nemours & Company under the trademark "Surlyn®" and more recently, by the Exxon Corporation (see U.S. Pat. No. 4,911,451) under the trademarks "Escor®" and the trade name "Iotek", have become the materials of choice for the construction of golf ball covers over the traditional "balata" (transpolyisoprene, natural or synthetic) rubbers. As stated, the softer balata covers, although exhibiting enhanced playability properties, lack the durability (cut and abrasion resistance, fatigue endurance, etc.) properties required for repetitive play.

Ionomeric resins are generally ionic copolymers of an olefin, such as ethylene, and a metal salt of an unsaturated carboxylic acid, such as acrylic acid, methacrylic acid, or maleic acid. Metal ions, such as sodium or zinc, are used to neutralize some portion of the acidic group in the copolymer resulting in a thermoplastic elastomer exhibiting enhanced properties, i.e. durability, etc., for golf ball cover construction over balata. However, some of the advantages gained in increased durability have been offset to some degree by the decreases produced in playability. This is because although the ionomeric resins are very durable, they tend to be very hard when utilized for golf ball cover construction, and thus lack the degree of softness required to impart the spin necessary to control the ball in flight. Since the ionomeric resins are harder than balata, the ionomeric resin covers do not compress as much against the face of the club upon impact, thereby producing less spin. In addition, the harder and more durable ionomeric resins lack the "feel" characteristic associated with the softer balata related covers.

As a result, while there are currently more than fifty (50) commercial grades of ionomers available both from DuPont and Exxon, with a wide range of properties which vary according to the type and amount of metal cations, molecular weight, composition of the base resin (i.e., relative content of ethylene and methacrylic and/or acrylic acid groups) and additive ingredients such as reinforcement agents, etc., a great deal of research continues in order to develop a golf ball cover composition exhibiting not only the improved impact resistance and carrying distance properties produced by the "hard" ionomeric resins, but also the playability (i.e., "spin", "feel", etc.) characteristics previously associated with the "soft" balata covers, properties which are still desired by the more skilled golfer.

Consequently, a number of two-piece (a solid resilient center or core with a molded cover) and three-piece (a liquid or solid center, elastomeric winding about the center, and a molded cover) golf balls have been produced by the present inventor and others to address these needs. The different types of materials utilized to formulate the cores, covers, etc. of these balls dramatically alters the balls' overall characteristics. In addition, multi-layered covers containing one or more ionomer resins have also been formulated in an attempt to produce a golf ball having the overall distance, playability and durability characteristics desired.

This was addressed by Spalding & Evenflo Companies, Inc., the assignee of the present invention, in U.S. Pat. No. 4,431,193 where a multi-layered golf ball is disclosed. In the '193 patent, a multi-layer golf ball is produced by initially molding a first cover layer on a spherical core and then adding a second layer. The first layer is comprised of a hard, high flexural modulus resinous material such as type 1605 Surlyn® (now designated Surlyn® 8940). Type 1605 Surlyn® (Surlyn® 8940) is a sodium ion based low acid (less than or equal to 15 weight percent methacrylic acid) ionomer resin having a flexural modulus of about 51,000 psi. An outer layer of a comparatively soft, low flexural modulus resinous material such as type 1855 Surlyn® (now designated Surlyn® 9020) is molded over the inner cover layer. Type 1855 Surlyn® (Surlyn® 9020) is a zinc ion based low acid (10 weight percent methacrylic acid) ionomer resin having a flexural modulus of about 14,000 psi.

The '193 patent teaches that the hard, high flexural modulus resin which comprises the first layer provides for a gain in coefficient of restitution over the coefficient of restitution of the core. The increase in the coefficient of restitution provides a ball which serves to attain or approach the maximum initial velocity limit of 255 feet per second as provided by the United States Golf Association (U.S.G.A.) rules. The relatively soft, low flexural modulus outer layer provides essentially no gain in the coefficient of restitution but provides for the advantageous "feel" and playing characteristics of a balata covered golf ball. Unfortunately, however, while a ball of the '193 patent does exhibit enhanced playability characteristics with improved distance (i.e. enhanced C.O.R. values) over a number of other known multi-layered balls, the ball suffers from poor cut resistance and relatively short distance (i.e. lower C.O.R. values) when compared to two-piece, single cover layer balls. These undesirable properties make the ball produced in accordance with the '193 patent unacceptable by today's standards.

The present invention is directed to new multi-layer golf ball compositions which provide for enhanced coefficient of restitution (i.e, enhanced resilience or carrying distance) and/or durability properties when compared to the multi-layer balls found in the prior art, as well as improved outer cover layer softness and durability. As such, the playability characteristics (i.e., "feel", "click", "spin", etc.) are not diminished.

These and other objects and features of the invention will be apparent from the following summary and description of the invention, the drawings and from the claims.

SUMMARY OF THE INVENTION

The present invention is directed to improved multi-layer golf ball cover compositions and the resulting multi-layer golf balls produced using the improved compositions. The novel multi-layer golf ball covers of the present invention include a first or inner layer or ply of a high acid (greater than 16 weight percent acid) ionomer or ionomer blend and second or outer layer or ply comprised of a comparatively softer, low modulus ionomer, ionomer blend or other non-ionomeric thermoplastic elastomer such as polyurethane, a polyester elastomer such as Hytrel® polyester elastomer of E. I. DuPont de Nemours & Company, or a polyesteramide such as the Elf Atochem S. A. Pebax® polyesteramide. Preferably, the outer cover layer includes a blend of hard and soft low acid (i.e. 16 weight percent acid or less) ionomers.

It has been found that the recently developed high acid ionomer based inner layer, provides for a substantial increase in resilience (i.e., enhanced distance) over known multi-layer covered balls. The softer outer layer provides for desirable "feel" and high spin rate while maintaining respectable resiliency. The soft outer layer allows the cover to deform more during impact and increases the area of contact between the club face and the cover, thereby imparting more spin on the ball. As a result, the soft cover provides the ball with a balata-like feel and playability characteristics with improved distance and durability. Consequently, the overall combination of the inner and outer cover layers results in a golf ball having enhanced resilience (improved travel distance) and durability (i.e. cut resistance, etc.) characteristics while maintaining and in many instances, improving the balls playability properties.

The combination of a high acid ionomer or ionomer blend inner cover layer with a soft, relatively low modulus ionomer, ionomer blend or other non-ionomeric thermoplastic elastomer outer cover layer provides for excellent overall coefficient of restitution (i.e., excellent resilience) because of the improved resiliency produced by the inner cover layer. While some improvement in resiliency is also produced by the outer cover layer, the outer cover layer generally provides for a more desirable feel and high spin, particularly at lower swing speeds with highly lofted clubs such as half wedge shots.

Two principal properties involved in golf ball performance are resilience and hardness. Resilience is determined by the coefficient of restitution (C.O.R.), the constant "e" which is the ratio of the relative velocity of two elastic spheres after direct impact to that before impact. As a result, the coefficient of restitution ("e") can vary from 0 to 1, with 1 being equivalent to an elastic collision and 0 being equivalent to an inelastic collision.

Resilience (C.O.R.), along with additional factors such as club head speed, angle of trajectory and ball configuration (i.e., dimple pattern) generally determine the distance a ball will travel when hit. Since club head speed and the angle of trajectory are factors not easily controllable by a manufacturer, factors of concern among manufacturers are the coefficient of restitution (C.O.R.) and the surface configuration of the ball.

The coefficient of restitution (C.O.R.) in solid core balls is a function of the composition of the molded core and of the cover. In balls containing a wound core (i.e., balls comprising a liquid or solid center, elastic windings, and a cover), the coefficient of restitution is a function of not only the composition of the center and cover, but also the composition and tension of the elastomeric windings. Although both the core and the cover contribute to the coefficient of restitution, the present invention is directed to the enhanced coefficient of restitution (and thus travel distance) which is affected by the cover composition.

In this regard, the coefficient of restitution of a golf ball is generally measured by propelling a ball at a given speed against a hard surface and measuring the ball's incoming and outgoing velocity electronically. As mentioned above, the coefficient of restitution is the ratio of the outgoing velocity to the incoming velocity. The coefficient of restitution must be carefully controlled in all commercial golf balls in order for the ball to be within the specifications regulated by the United States Golf Association (U.S.G.A.). Along this line, the U.S.G.A. standards indicate that a "regulation" ball cannot have an initial velocity (i.e., the speed off the club) exceeding 255 feet per second. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

The hardness of the ball is the second principal property involved in the performance of a golf ball. The hardness of the ball can affect the playability of the ball on striking and the sound or "click" produced. Hardness is determined by the deformation (i.e., compression) of the ball under various load conditions applied across the ball's diameter (i.e., the lower the compression value, the harder the material). As indicated in U.S. Pat. No. 4,674,751, softer covers permit the accomplished golfer to impart proper spin. This is because the softer covers deform on impact significantly more than balls having "harder" ionomeric resin covers. As a result, the better player is allowed to impart fade, draw or backspin to the ball thereby enhancing playability. Such properties may be determined by various spin rate tests such as the "nine iron" spin rate test described below in the Examples.

Accordingly, the present invention is directed to an improved multi-layer cover which produces, upon molding each layer around a core (preferably a solid core) to formulate a multi-layer cover, a golf ball exhibiting enhanced distance (i.e., resilience) without adversely affecting, and in many instances, improving the ball's playability (hardness/softness) and/or durability (i.e., cut resistance, fatigue resistance, etc.) characteristics.

These and other objects and features of the invention will be apparent from the following detailed description.

DETAILED DESCRIPTION OF THE INVENTION

Figure 1:
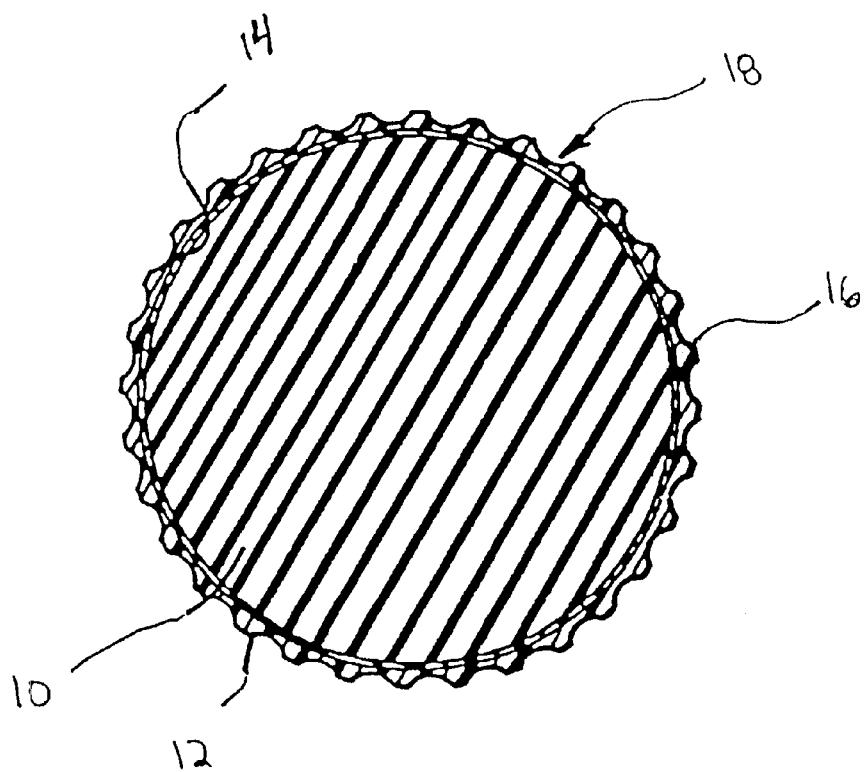
FIG. 1 is a cross-sectional view of a golf ball embodying the invention illustrating a core 10 and a cover 12 consisting of an inner layer 14 and an outer layer 16 having dimples 18.
Figure 2:
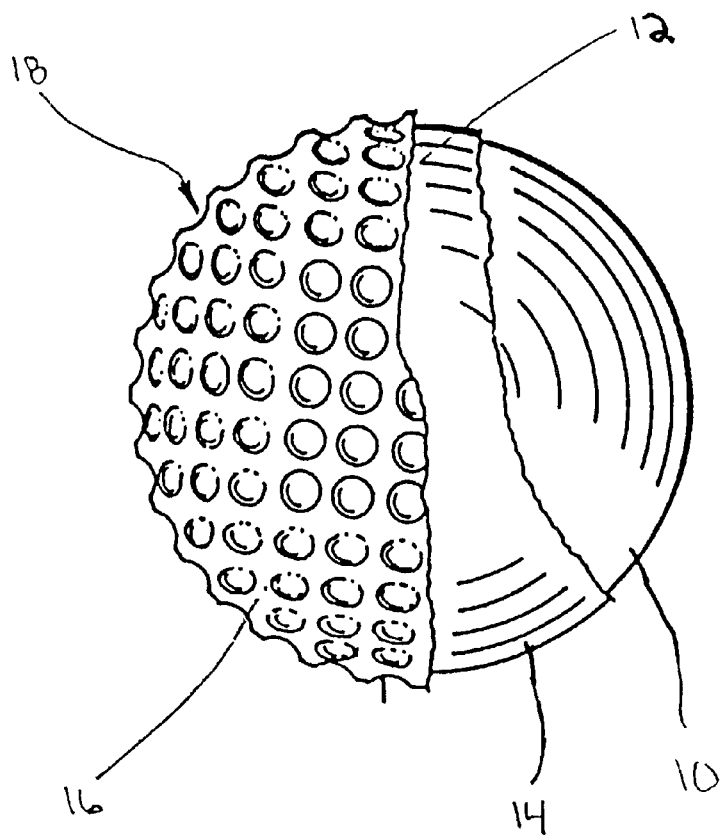
FIG. 2 is a diametrical cross-sectional view of a golf ball of the invention having a core 10 and a cover 12 made of an inner layer 14 and an outer layer 16 having dimple 18.

The present invention relates to improved multi-layer golf balls, particularly a golf ball comprising a multi-layered cover 12 over a solid core 10, and method for making same.

The multi-layered cover 12 comprises two layers: a first or inner layer or ply 14 and a second or outer layer or ply 16. The inner layer 14 is comprised of a high acid (i.e. greater than 16 weight percent acid) ionomer resin or high acid ionomer blend. Preferably, the inner layer is comprised of a blend of two or more high acid (i.e. at least 16 weight percent acid) ionomer resin neutralized to various extents by different metal cations. The inner cover layer may or may not include a metal stearate, (e.g., zinc stearate) or other metal fatty acid salt. The purpose of the metal stearate or other metal fatty acid salt is to lower the cost of production without affecting the overall performance of the finished golf ball.

The inner layer compositions include the high acid ionomers such as those recently developed by E. I. DuPont de Nemours & Company under the trademark "Surlyn®" and by Exxon Corporation under the trademark "Escor®" or tradename "Iotek", or blends thereof. Examples of compositions which may be used as the inner layer herein are set forth in detail in copending U.S. Ser. No. 07/776,803 filed Oct. 15, 1991, and Ser. No. 07/901,660 filed Jun. 19, 1992, both incorporated herein by reference. Of course, the inner layer high acid ionomer compositions are not limited in any way to those compositions set forth in said copending applications. For example, the high acid ionomer resins recently developed by Spalding & Evenflo Companies, Inc., the assignee of the present invention, and disclosed in U.S. Ser. No. 07/901,680, filed Jun. 19, 1992, incorporated herein by reference, may also be utilized to produce the inner layer of the multi-layer cover used in the present invention.

The high acid ionomers which may be suitable for use in formulating the inner layer compositions of the subject invention are ionic copolymers which are the metal, i.e., sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e., iso- or n-butylacrylate, etc.) can also be included to produce a softer terpolymer. The carboxylic acid groups of the copolymer are partially neutralized (i.e., approximately 10–75%, preferably 30–70%) by the metal ions. Each of the high acid ionomer resins which may be included in the inner layer cover compositions of the invention contains greater than about 16% by weight of a carboxylic acid, preferably from about 17% to about 25% by weight of a carboxylic acid, more preferably from about 18.5% to about 21.5% by weight of a carboxylic acid.

Although the inner layer cover composition preferably includes a high acid ionomeric resin and the scope of the patent embraces all known high acid ionomeric resins falling within the parameters set forth above, only a relatively limited number of these high acid ionomeric resins have recently become commercially available.

The high acid ionomeric resins available from Exxon under the designation "Escor®" and or "Iotek", are somewhat similar to the high acid ionomeric resins available under the "Surlyn®" trademark. However, since the Escor®/Iotek ionomeric resins are sodium or zinc salts of poly(ethylene-acrylic acid) and the "Surlyn®" resins are zinc, sodium, magnesium, etc. salts of poly(ethylene-methacrylic acid), distinct differences in properties exist.

Examples of the high acid methacrylic acid based ionomers found suitable for use in accordance with this invention include Surlyn® AD-8422 (sodium cation), Surlyn® 8162 (zinc cation), Surlyn® SEP-503-1 (zinc cation), and Surlyn® SEP-503-2 (magnesium cation). According to DuPont, all of these ionomers contain from about 18.5 to about 21.5% by weight methacrylic acid.

More particularly, Surlyn® AD-8422 is currently commercially available from DuPont in a number of different grades (i.e., AD-8422-2, AD-8422-3, AD-8422-5, etc.) based upon differences in melt index. According to DuPont, Surlyn® AD-8422 offers the following general properties when compared to Surlyn®8920, the stiffest, hardest of all on the low acid grades (referred to as "hard" ionomers in U.S. Pat. No. 4,884,814):

|  | LOW ACID (15 wt % Acid) | HIGH ACID (>20 wt % Acid) | |
|---|---|---|---|
|  | SURLYN ® 8920 | SURLYN ® 8422-2 | SURLYN ® 8422-3 |
| IONOMER |  |  |  |
| Cation | Na | Na | Na |
| Melt Index | 1.2 | 2.8 | 1.0 |
| Sodium, Wt % | 2.3 | 1.9 | 2.4 |
| Base Resin MI | 60 | 60 | 60 |
| MP$^1$, ° C. | 88 | 86 | 85 |
| FP$^1$, ° C. | 47 | 48.5 | 45 |
| COMPRESSION MOLDING$^2$ |  |  |  |
| Tensile Break, psi | 4350 | 4190 | 5330 |
| Yield, psi | 2880 | 3670 | 3590 |
| Elongation, % | 315 | 263 | 289 |
| Flex Mod, K psi | 53.2 | 76.4 | 88.3 |
| Shore D hardness | 66 | 67 | 68 |

$^1$DSC second heat, 10° C./min heating rate.
$^2$Samples compression molded at 150° C. annealed 24 hours at 60° C. 8422-2, -3 were homogenized at 190° C. before molding.

In comparing Surlyn® 8920 to Surlyn® 8422-2 and Surlyn® 8422-3, it is noted that the high acid Surlyn® 8422-2 and 8422-3 ionomers have a higher tensile yield, lower elongation, slightly higher Shore D hardness and much higher flexural modulus. Surlyn® 8920 contains 15 weight percent methacrylic acid and is 59% neutralized with sodium.

In addition, Surlyn® SEP-503-1 (zinc cation) and Surlyn® SEP-503-2 (magnesium cation) are high acid zinc and magnesium versions of the Surlyn® AD 8422 high acid ionomers. When compared to the Surlyn® AD 8422 high acid ionomers, the Surlyn SEP-503-1 and SEP-503-2 ionomers can be defined as follows:

| Surlyn ® Ionomer | Ion | Melt Index | Neutralization % |
|---|---|---|---|
| AD 8422-3 | Na | 1.0 | 45 |
| SEP 503-1 | Zn | 0.8 | 38 |
| SEP 503-2 | Mg | 1.8 | 43 |

Furthermore, Surlyn® 8162 is a zinc cation ionomer resin containing approximately 20% by weight (i.e. 18.5–21.5% weight) methacrylic acid copolymer that has been 30–70% neutralized. Surlyn® 8162 is currently commercially available from DuPont.

Examples of the high acid acrylic acid based ionomers suitable for use in the present invention also include the Escor® or Iotek high acid ethylene acrylic acid ionomers produced by Exxon. In this regard, Escor® or Iotek 959 is a sodium ion neutralized ethylene-acrylic neutralized ethylene-acrylic acid copolymer. According to Exxon, Ioteks 959 and 960 contain from about 19.0 to about 21.0% by weight acrylic acid with approximately 30 to about 70 percent of the acid groups neutralized with sodium and zinc ions, respectively. The physical properties of these high acid acrylic acid based ionomers are as follows:

| PROPERTY | ESCOR ® (IOTEK) 959 | ESCOR ® (IOTEK) 960 |
|---|---|---|
| Melt Index, g/10 min | 2.0 | 1.8 |
| Cation | Sodium | Zinc |
| Melting Point, ° F. | 172 | 174 |
| Vicat Softening Point, ° F. | 130 | 131 |
| Tensile @ Break, psi | 4600 | 3500 |
| Elongation @ Break, % | 325 | 430 |
| Hardness, Shore D | 66 | 57 |
| Flexural Modulus, psi | 66,000 | 27,000 |

Furthermore, as a result of the development by the inventor of a number of new high acid ionomers neutralized to various extents by several different types of metal cations, such as by manganese, lithium, potassium, calcium and nickel cations, several new high acid ionomers and/or high acid ionomer blends besides sodium, zinc and magnesium high acid ionomers or ionomer blends are now available for golf ball cover production. It has been found that these new cation neutralized high acid ionomer blends produce inner cover layer compositions exhibiting enhanced hardness and resilience due to synergies which occur during processing. Consequently, the metal cation neutralized high acid ionomer resins recently produced can be blended to produce substantially harder inner cover layers for multi-layered golf balls having higher C.O.R.'s than those produced by the low acid ionomer inner cover compositions presently commercially available.

More particularly, several new metal cation neutralized high acid ionomer resins have been produced by the inventor by neutralizing, to various extents, high acid copolymers of an alpha-olefin and an alpha, beta-unsaturated carboxylic acid with a wide variety of different metal cation salts. This discovery is the subject matter of U.S. application Ser. No. 901,680, incorporated herein by reference. It has been found that numerous new metal cation neutralized high acid ionomer resins can be obtained by reacting a high acid copolymer (i.e. a copolymer containing greater than 16% by weight acid, preferably from about 17 to about 25 weight percent acid, and more preferably about 20 weight percent acid), with a metal cation salt capable of ionizing or neutralizing the copolymer to the extent desired (i.e. from about 10% to 90%).

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic, acid, ethacrylic acid, chloroacrylic acid, crotonic acid, maleic acid, fumaric acid, and itaconic acid, with acrylic acid being preferred.

The softening comonomer that can be optionally included in the invention may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 30 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

Along these lines, examples of the preferred high acid base copolymers which fulfill the criteria set forth above, are a series of ethylene-acrylic copolymers which are commercially available from The Dow Chemical Company, Midland, Mich., under the "Primacor" designation. These high acid base copolymers exhibit the typical properties set forth below in Table 1.

acetate, nickel oxide and nickel hydroxide. Sources of magnesium include magnesium oxide, magnesium hydroxide, magnesium acetate. Sources of manganese include manganese acetate and manganese oxide.

The new metal cation neutralized high acid ionomer resins are produced by reacting the high acid base copolymer with various amounts of the metal cation salts above the crystalline melting point of the copolymer, such as at a temperature from about 200° F. to about 500° F., preferably from about 250° F. to about 350° F. under high shear conditions at a pressure of from about 10 psi to 10,000 psi. Other well known blending techniques may also be used. The amount of metal cation salt utilized to produce the new metal cation neutralized high acid based ionomer resins is the quantity which provides a sufficient amount of the metal cations to neutralize the desired percentage of the carboxylic acid groups in the high acid copolymer. The extent of neutralization is generally from about 10% to about 90%.

As indicated below in Table 2 and more specifically in Example 1 in U.S. application Ser. No. 901,680, a number of new types of metal cation neutralized high acid ionomers can be obtained from the above indicated process. These include new high acid ionomer resins neutralized to various extents with manganese, lithium, potassium, calcium and nickel cations. In addition, when a high acid ethylene/acrylic acid copolymer is utilized as the base copolymer component

TABLE 1

Typical Properties of Primacor Ethylene-Acrylic Acid Copolymers

| GRADE | PERCENT ACID | DENSITY, g/cc | MELT INDEX, g/10 min | TENSILE YD. ST (psi) | FLEXURAL MODULUS (psi) | VICAT SOFT PT (° C.) | SHORE D HARDNESS |
|---|---|---|---|---|---|---|---|
| ASTM |  | D-792 | D-1238 | D-638 | D-790 | D-1525 | D-2240 |
| 5980 | 20.0 | 0.958 | 300.0 | — | 4800 | 43 | 50 |
| 5990 | 20.0 | 0.955 | 1300.0 | 650 | 2600 | 40 | 42 |
| 5990 | 20.0 | 0.955 | 1300.0 | 650 | 3200 | 40 | 42 |
| 5981 | 20.0 | 0.960 | 300.0 | 900 | 3200 | 46 | 48 |
| 5981 | 20.0 | 0.960 | 300.0 | 900 | 3200 | 46 | 48 |
| 5983 | 20.0 | 0.958 | 500.0 | 850 | 3100 | 44 | 45 |
| 5991 | 20.0 | 0.953 | 2600.0 | 635 | 2600 | 38 | 40 |

[1]The Melt Index values are obtained according to ASTM D-1238, at 190° C.

Due to the high molecular weight of the Primacor 5981 grade of the ethylene-acrylic acid copolymer, this copolymer is the more preferred grade utilized in the invention.

The metal cation salts utilized in the invention are those salts which provide the metal cations capable of neutralizing, to various extents, the carboxylic acid groups of the high acid copolymer. These include acetate, oxide or hydroxide salts of lithium, calcium, zinc, sodium, potassium, nickel, magnesium, and manganese.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel of the invention and this component is subsequently neutralized to various extents with the metal cation salts producing acrylic acid based high acid ionomer resins neutralized with cations such as sodium, potassium, lithium, zinc, magnesium, manganese, calcium and nickel, several new cation neutralized acrylic acid based high acid ionomer resins are produced.

TABLE 2

| Formulation No. | Wt-% Cation Salt | Wt-% Neutralization | Melt Index | C.O.R. | Shore D Hardness |
|---|---|---|---|---|---|
| 1 (NaOH) | 6.98 | 67.5 | 0.9 | .804 | 71 |
| 2 (NaOH) | 5.66 | 54.0 | 2.4 | .808 | 73 |
| 3 (NaOH) | 3.84 | 35.9 | 12.2 | .812 | 69 |
| 4 (NaOH) | 2.91 | 27.0 | 17.5 | .812 | (brittle) |
| 5 (MnAc) | 19.6 | 71.7 | 7.5 | .809 | 73 |
| 6 (MnAc) | 23.1 | 88.3 | 3.5 | .814 | 77 |
| 7 (MnAc) | 15.3 | 53.0 | 7.5 | .810 | 72 |

TABLE 2-continued

| Formulation No. | Wt-% Cation Salt | Wt-% Neutralization | Melt Index | C.O.R. | Shore D Hardness |
|---|---|---|---|---|---|
| 8 (MnAc) | 26.5 | 106 | 0.7 | .813 | (brittle) |
| 9 (LiOH) | 4.54 | 71.3 | 0.6 | .810 | 74 |
| 10 (LiOH) | 3.38 | 52.5 | 4.2 | .818 | 72 |
| 11 (LiOH) | 2.34 | 35.9 | 18.6 | .815 | 72 |
| 12 (KOH) | 5.30 | 36.0 | 19.3 | Broke | 70 |
| 13 (KOH) | 8.26 | 57.9 | 7.18 | .804 | 70 |
| 14 (KOH) | 10.7 | 77.0 | 4.3 | .801 | 67 |
| 15 (ZnAc) | 17.9 | 71.5 | 0.2 | .806 | 71 |
| 16 (ZnAc) | 13.9 | 53.0 | 0.9 | .797 | 69 |
| 17 (ZnAc) | 9.91 | 36.1 | 3.4 | .793 | 67 |
| 18 (MgAc) | 17.4 | 70.7 | 2.8 | .814 | 74 |
| 19 (MgAc) | 20.6 | 87.1 | 1.5 | .815 | 76 |
| 20 (MgAc) | 13.8 | 53.8 | 4.1 | .814 | 74 |
| 21 (CaAc) | 13.2 | 69.2 | 1.1 | .813 | 74 |
| 22 (CaAc) | 7.12 | 34.9 | 10.1 | .808 | 70 |
| 23 (MgO) | 2.91 | 53.5 | 2.5 | .813 | |
| 24 (MgO) | 3.85 | 71.5 | 2.8 | .808 | |
| 25 (MgO) | 4.76 | 89.3 | 1.1 | .809 | |
| 26 (MgO) | 1.96 | 35.7 | 7.5 | .815 | |
| 27 (NiAc) | 13.04 | 61.1 | 0.2 | .802 | 71 |
| 28 (NiAc) | 10.71 | 48.9 | 0.5 | .799 | 72 |
| 29 (NiAc) | 8.26 | 36.7 | 1.8 | .796 | 69 |
| 30 (NiAc) | 5.66 | 24.4 | 7.5 | .786 | 64 |

Controls: 50/50 Blend of Ioteks 8000/7030 C.O.R. = .810/65 Shore D Hardness
DuPont High Acid Surlyn ® 8422 (Na) C.0.R.= .811/70 Shore D Hardness
DuPont High Acid Surlyn ® 8162 (Zn) C.0.R.= .807/65 Shore D Hardness
Exxon High Acid Iotek EX-960 (Zn) C.0.R.= .796/65 Shore D Hardness
Control for Formulations 23–26 is 50/50 Iotek 8000/7030, C.O.R. = .814,
Formulation 26 C.0.R. was normalized to that control accordingly
Control for Formulation Nos. 27–30 is 50/50 Iotek 8000/7030, C.0.R. = .807

When compared to low acid versions of similar cation neutralized ionomer resins, the new metal cation neutralized high acid ionomer resins exhibit enhanced hardness, modulus and resilience characteristics. These are properties that are particularly desirable in a number of thermoplastic fields, including the field of golf ball manufacturing.

When utilized in the construction of the inner layer of a multi-layered golf ball, it has been found that the new acrylic acid based high acid ionomers extend the range of hardness beyond that previously obtainable while maintaining the beneficial properties (i.e. durability, click, feel, etc.) of the softer low acid ionomer covered balls, such as balls produced utilizing the low acid ionomers disclosed in U.S. Pat. Nos. 4,884,814 and 4,911,451.

Moreover, as a result of the development of a number of new acrylic acid based high acid ionomer resins neutralized to various extents by several different types of metal cations, such as manganese, lithium, potassium, calcium and nickel cations, several new ionomers or ionomer blends are now available for production of an inner cover layer of a multi-layered golf ball. By using these high acid ionomer resins, harder, stiffer inner cover layers having higher C.O.R.s, and thus longer distance, can be obtained.

More preferably, it has been found that when two or more of the above-indicated high acid ionomers, particularly blends of sodium and zinc high acid ionomers, are processed to produce the covers of multi-layered golf balls, (i.e., the inner cover layer herein) the resulting golf balls will travel further than previously known multi-layered golf balls produced with low acid ionomer resin covers due to the balls' enhanced coefficient of restitution values.

For example, the multi-layer golf ball taught in U.S. Pat. No. 4,650,193 does not incorporate a high acid ionomer resin in the inner cover layer. As will be set forth below in the Examples, the coefficient of restitution of the golf ball having an inner layer taught by the '193 patent (i.e., inner layer composition "D" in the Examples) is substantially lower than the coefficient of restitution of the remaining compositions. In addition, the multi-layered ball disclosed in the '193 patent suffers substantially in durability in comparison with the present invention.

With respect to the outer layer 16 of the multi-layered cover of the present invention, the outer cover layer is comparatively softer than the high acid ionomer based inner layer. The softness provides for the feel and playability characteristics typically associated with balata or balata-blend balls. The outer cover layer has a modulus in a range of from about 1,000 psi to about 30,000 psi. The outer layer or ply is comprised of a relatively soft, low modulus (about 1,000 psi to about 10,000 psi) and low acid (less than 16 weight percent acid) ionomer, ionomer blend or a non-ionomeric thermoplastic elastomer such as, but not limited to, a polyurethane, a polyester elastomer such as that marketed by DuPont under the trademark Hytrel®, or a polyester amide such as that marketed by Elf Atochem S.A. under the trademark Pebax®. The outer layer is fairly thin (i.e. from about 0.010 to about 0.050 in thickness, more desirably 0.03 inches in thickness for a 1.680 inch ball), but thick enough to achieve desired playability characteristics while minimizing expense.

Preferably, the outer layer includes a blend of hard and soft (low acid) ionomer resins such as those described in U.S. Pat. Nos. 4,884,814 and 5,120,791, both incorporated herein by reference. Specifically, a desirable material for use in molding the outer layer comprises a blend of a high modulus (hard) ionomer with a low modulus (soft) ionomer to form a base ionomer mixture. A high modulus ionomer herein is one which measures from about 15,000 to about 70,000 psi as measured in accordance with ASTM method D-790. The hardness may be defined as at least 50 on the Shore D scale as measured in accordance with ASTM method D-2240.

A low modulus ionomer suitable for use in the outer layer blend has a flexural modulus measuring from about 1,000 to about 10,000 psi, with a hardness of about 20 to about 40 on the Shore D scale.

The hard ionomer resins utilized to produce the outer cover layer composition hard/soft blends include ionic copolymers which are the sodium, zinc, magnesium or lithium salts of the reaction product of an olefin having from 2 to 8 carbon atoms and an unsaturated monocarboxylic acid having from 3 to 8 carbon atoms. The carboxylic acid groups of the copolymer may be totally or partially (i.e. approximately 15–75 percent) neutralized.

The hard ionomeric resins are likely copolymers of ethylene and either acrylic and/or methacrylic acid, with copolymers of ethylene and acrylic acid being the most preferred. Two or more types of hard ionomeric resins may be blended into the outer cover layer compositions in order to produce the desired properties of the resulting golf balls.

As discussed earlier herein, the hard ionomeric resins introduced under the designation Escor® and sold under the designation "Iotek" are somewhat similar to the hard ionomeric resins sold under the Surlyn® trademark. However, since the "Iotek" ionomeric resins are sodium or zinc salts of poly(ethylene-acrylic acid) and the Surlyns® resins are zinc or sodium salts of poly(ethylene-methacrylic acid) some distinct differences in properties exist. As more specifically indicated in the data set forth below, the hard "Iotek" resins (i.e., the acrylic acid based hard ionomer resins) are the more preferred hard resins for use in formulating the outer layer blends for use in the present invention. In addition, various blends of "Iotek" and Surlyn® hard ionomeric resins, as well as other available ionomeric resins, may be utilized in the present invention in a similar manner.

Examples of commercially available hard ionomeric resins which may be used in the present invention in formulating the outer cover blends include the hard sodium ionic copolymer sold under the trademark Surlyn®8940 and the hard zinc ionic copolymer sold under the trademark Surlyn®9910. Surlyn®8940 is a copolymer of ethylene with methacrylic acid and about 15 weight percent acid which is about 29 percent neutralized with sodium ions. This resin has an average melt flow index of about 2.8. Surlyn®9910 is a copolymer of ethylene and methacrylic acid with about 15 weight percent acid which is about 58 percent neutralized with zinc ions. The average melt flow index of Surlyn®9910 is about 0.7. The typical properties of Surlyn®9910 and 8940 are set forth below in Table 3:

TABLE 3

Typical Properties of Commercially Available Hard Surlyn ® Resins Suitable for Use in the Outer Layer Blends of the Present Invention

|  | ASTM D | 8940 | 9910 | 8920 | 8528 | 9970 | 9730 |
|---|---|---|---|---|---|---|---|
| Cation Type |  | Sodium | Zinc | Sodium | Sodium | Zinc | Zinc |
| Melt flow index, gms/10 min. | D-1238 | 2.8 | 0.7 | 0.9 | 1.3 | 14.0 | 1.6 |
| Specific Gravity, g/cm$^3$ | D-792 | 0.95 | 0.97 | 0.95 | 0.94 | 0.95 | 0.95 |
| Hardness, Shore D | D-2240 | 66 | 64 | 66 | 60 | 62 | 63 |
| Tensile Strength, (kpsi), MPa | D-638 | (4.8) 33.1 | (3.6) 24.8 | (5.4) 37.2 | (4.2) 29.0 | (3.2) 22.0 | (4.1) 28.0 |
| Elongation, % | D-638 | 470 | 290 | 350 | 450 | 460 | 460 |
| Flexural Modulus, (kpsi) MPa | D-790 | (51) 350 | (48) 330 | (55) 380 | (32) 220 | (28) 190 | (30) 210 |
| Tensile Impact (23° C.) KJ/m$_2$ (ft.-lbs./in$^2$) | D-1822S | 1020 (485) | 1020 (485) | 865 (410) | 1160 (550) | 760 (360) | 1240 (590) |
| Vicat Temperature, ° C. | D-1525 | 63 | 62 | 58 | 73 | 61 | 73 |

Examples of the more pertinent acrylic acid based hard ionomer resin suitable for use in the present outer cover composition sold under the "Iotek" tradename by the Exxon Corporation include Iotek 4000, Iotek 4010, Iotek 8000, Iotek 8020 and Iotek 8030. The typical properties of these and other Iotek hard ionomers suited for use in formulating the outer layer cover composition are set forth below in Table 4:

TABLE 4

Typical Properties of Iotek Ionomers

|  | ASTM Method | Units | 4000 | 4010 | 8000 | 8020 | 8030 | 7010 | 7020 | 7030 |
|---|---|---|---|---|---|---|---|---|---|---|
| Resin Properties |  |  |  |  |  |  |  |  |  |  |
| Cation type |  |  | zinc | zinc | sodium | sodium | sodium | zinc | zinc | zinc |
| Melt index | D-1238 | g/10 min. | 2.5 | 1.5 | 0.8 | 1.6 | 2.8 | 0.8 | 1.5 | 2.5 |
| Density | D-1505 | kg/m$^3$ | 963 | 963 | 954 | 960 | 960 | 960 | 960 | 960 |
| Melting Point | D-3417 | ° C. | 90 | 90 | 90 | 87.5 | 87.5 | 90 | 90 | 90 |
| Crystallization Point | D-3417 | ° C. | 62 | 64 | 56 | 53 | 55 | — | — | — |
| Vicat Softening Point | D-1525 | ° C. | 62 | 63 | 61 | 64 | 67 | 60 | 63 | 62.5 |
| % Weight Acrylic Acid |  |  | 16 |  | 11 |  |  | — | — | — |
| % of Acid Groups cation neutralized |  |  | 30 |  | 40 |  |  | — | — | — |
| Plaque Properties (3 mm thick, compression molded) |  |  |  |  |  |  |  |  |  |  |
| Tensile at break | D-638 | MPa | 24 | 26 | 36 | 31.5 | 28 | 38 | 38 | 38 |
| Yield point | D-638 | MPa | none | none | 21 | 21 | 23 | none | none | none |
| Elongation at break | D-638 | % | 395 | 420 | 350 | 410 | 395 | 500 | 420 | 395 |
| 1% Secant modulus | D-638 | MPa | 160 | 160 | 300 | 350 | 390 | — | — | — |
| Shore Hardness D | D-2240 | — | 55 | 55 | 61 | 58 | 59 | 57 | 55 | 55 |
| Film Properties (50 micron film 2.2:1 |  |  |  |  |  |  |  |  |  |  |

TABLE 4-continued

Typical Properties of Iotek Ionomers

| | ASTM Method | Units | 4000 | 4010 | 8000 | 8020 | 8030 | 7010 | 7020 | 7030 |
|---|---|---|---|---|---|---|---|---|---|---|
| Blow-up ratio) | | | | | | | | | | |
| Tensile at Break MD | D-882 | MPa | 41 | 39 | 42 | 52 | 47.4 | | | |
| TD | D-882 | MPa | 37 | 38 | 38 | 38 | 40.5 | | | |
| Yield point MD | D-882 | MPa | 15 | 17 | 17 | 23 | 21.6 | | | |
| TD | D-882 | MPa | 14 | 15 | 15 | 21 | 20.7 | | | |
| Elongation at Break MD | D-882 | % | 310 | 270 | 260 | 295 | 305 | | | |
| TD | D-882 | % | 360 | 340 | 280 | 340 | 345 | | | |
| 1% Secant modulus MD | D-882 | MPa | 210 | 215 | 390 | 380 | 380 | | | |
| TD | D-882 | MPa | 200 | 225 | 380 | 350 | 345 | | | |
| Dart Drop Impact | D-1709 | g/micron | 12.4 | 12.5 | 20.3 | | | | | |

Comparatively, soft ionomers are used in formulating the hard/soft blends of the outer cover composition. These ionomers include acrylic acid based soft ionomers. They are generally characterized as comprising sodium or zinc salts of a terpolymer of an olefin having from about 2 to 8 carbon atoms, acrylic acid, and an unsaturated monomer of the acrylate ester class having from 1 to 21 carbon atoms. The soft ionomer is preferably a zinc based ionomer made from an acrylic acid base polymer in an unsaturated monomer of the acrylate ester class. The soft (low modulus) ionomers have a hardness from about 20 to about 40 as measured on the Shore D scale and a flexural modulus from about 1,000 to about 10,000, as measured in accordance with ASTM method D-790.

Certain ethylene-acrylic acid based soft ionomer resins developed by the Exxon Corporation under the designation "Iotek 7520" (referred to experimentally by differences in neutralization and melt indexes as LDX 195, LDX 196, LDX 218 and LDX 219) may be combined with known hard ionomers such as those indicated above to produce the outer cover. The combination produces higher C.O.R.s at equal or softer hardness, higher melt flow (which corresponds to improved, more efficient molding, i.e., fewer rejects) as well as significant cost savings versus the outer layer of multi-layer balls produced by other known hard-soft ionomer blends as a result of the lower overall raw materials costs and improved yields.

While the exact chemical composition of the resins to be sold by Exxon under the designation Iotek 7520 is considered by Exxon to be confidential and proprietary information, Exxon's experimental product data sheet lists the following physical properties of the ethylene acrylic acid zinc ionomer developed by Exxon:

TABLE 5

| Property | ASTM Method | Units | Typical Value |
|---|---|---|---|
| Physical Properties of Iotek 7520 | | | |
| Melt Index | D-1238 | g/10 min. | 2 |
| Density | D-1505 | kg/m³ | 0.962 |
| Cation | | | Zinc |
| Melting Point | D-3417 | ° C. | 66 |
| Crystallization Point | D-3417 | ° C. | 49 |

TABLE 5-continued

| Property | ASTM Method | Units | Typical Value |
|---|---|---|---|
| Vicat Softening Point | D-1525 | ° C. | 42 |
| Plaque Properties (2 mm thick Compression Molded Plaques) | | | |
| Tensile at Break | D-638 | MPa | 10 |
| Yield Point | D-638 | MPa | None |
| Elongation at Break | D-638 | % | 760 |
| 1% Secant Modulus | D-638 | MPa | 22 |
| Shore D Hardness | D-2240 | | 32 |
| Flexural Modulus | D-790 | MPa | 26 |
| Zwick Rebond | ISO 4862 | % | 52 |
| De Mattia Flex Resistance | D-430 | Cycles | >5000 |

In addition, test data collected by the inventor indicates that Iotek 7520 resins have Shore D hardnesses of about 32 to 36 (per ASTM D-2240), melt flow indexes of 3±0.5 g/10 min (at 190° C. per ASTM D-1288), and a flexural modulus of about 2500–3500 psi (per ASTM D-790). Furthermore, testing by an independent testing laboratory by pyrolysis mass spectrometry indicates that Iotek 7520 resins are generally zinc salts of a terpolymer of ethylene, acrylic acid, and methyl acrylate.

Furthermore, the inventor has found that a newly developed grade of an acrylic acid based soft ionomer available from the Exxon Corporation under the designation Iotek 7510, is also effective, when combined with the hard ionomers indicated above in producing golf ball covers exhibiting higher C.O.R. values at equal or softer hardness than those produced by known hard-soft ionomer blends. In this regard, Iotek 7510 has the advantages (i.e. improved flow, higher C.O.R. values at equal hardness, increased clarity, etc.) produced by the Iotek 7520 resin when compared to the methacrylic acid base soft ionomers known in the art (such as the Surlyn 8625 and the Surlyn 8629 combinations disclosed in U.S. Pat. No. 4,884,814).

In addition, Iotek 7510, when compared to Iotek 7520, produces slightly higher C.O.R. valves at equal softness/hardness due to the Iotek 7510's higher hardness and neutralization. Similarly, Iotek 7510 produces better release properties (from the mold cavities) due to its slightly higher stiffness and lower flow rate than Iotek 7520. This is important in production where the soft covered balls tend to have lower yields caused by sticking in the molds and subsequent punched pin marks from the knockouts.

According to Exxon, Iotek 7510 is of similar chemical composition as Iotek 7520 (i.e. a zinc salt of a terpoloymer of ethylene, acrylic acid, and methyl acrylate) but is more highly neutralized. Based upon FTIR analysis, Iotek 7520 is estimated to be about 30–40 wt.-% neutralized and Iotek 7510 is estimated to be about 40–60 wt.-% neutralized. The typical properties of Iotek 7510 in comparison of those of Iotek 7520 are set forth below:

TABLE 6

Physical Properties of Iotek 7510 in Comparison to Iotek 7520

|  | IOTEK 7520 | IOTEK 7510 |
| --- | --- | --- |
| MI, g/10 min | 2.0 | 0.8 |
| Density, g/cc | 0.96 | 0.97 |
| Melting Point, °F. | 151 | 149 |
| Vicat Softening Point, °F. | 108 | 109 |
| Flex Modulus, psi | 3800 | 5300 |
| Tensile Strength, psi | 1450 | 1750 |
| Elongation, % | 760 | 690 |
| Hardness, Shore D | 32 | 35 |

It has been determined that when hard/soft ionomer blends are used for the outer cover layer, good results are achieved when the relative combination is in a range of about 90 to about 10 percent hard ionomer and about 10 to about 90 percent soft ionomer. The results are improved by adjusting the range to about 75 to 25 percent hard ionomer and 25 to 75 percent soft ionomer. Even better results are noted at relative ranges of about 60 to 90 percent hard ionomer resin and about 40 to 60 percent soft ionomer resin.

Specific formulations which may be used in the cover composition are included in the examples set forth in U.S. Pat. Nos. 5,120,791 and 4,884,814. The present invention is in no way limited to those examples.

Moreover, in alternative embodiments, the outer cover layer formulation may also comprise a soft, low modulus non-ionomeric thermoplastic elastomer including a polyester polyurethane such as B. F. Goodrich Company's Estane® polyester polyurethane X-4517. According to B. F. Goodrich, Estane® X-4517 has the following properties:

| Properties of Estane ®X-4517 | |
| --- | --- |
| Tensile | 1430 |
| 100% | 815 |
| 200% | 1024 |
| 300% | 1193 |
| Elongation | 641 |
| Youngs Modulus | 1826 |
| Hardness A/D | 88/39 |
| Dayshore Rebound | 59 |
| Solubility in Water | Insoluble |
| Melt processing temperature | >350° F. (>177° C.) |
| Specific Gravity ($H_2O$ = 1) | 1.1–1.3 |

Other soft, relatively low modulus non-ionomeric thermoplastic elastomers may also be utilized to produce the outer cover layer as long as the non-ionomeric thermoplastic elastomers produce the playability and durability characteristics desired without adversely effecting the enhanced travel distance characteristic produced by the high acid ionomer resin composition. These include, but are not limited to thermoplastic polyurethanes such as: Texin thermoplastic polyurethanes from Mobay Chemical Co. and the Pellethane thermoplastic polyurethanes from Dow Chemical Co.; Ionomer/rubber blends such as those in Spalding U.S. Pat. Nos. 4,986,545; 5,098,105 and 5,187,013; and, Hytrel polyester elastomers from DuPont and pebax polyesteramides from Elf Atochem S. A.

In preparing golf balls in accordance with the present invention, a hard inner cover layer is molded (by injection molding or by compression molding) about a core (preferably a solid core). A comparatively softer outer layer is molded over the inner layer.

The conventional solid core is about 1.545 inches in diameter, although it can range from about 1.495 to about 1.575 inches. Conventional solid cores are typically compression molded from a slug of uncured or lightly cured elastomer composition comprising a high cis content polybutadiene and a metal salt of an $\alpha$, $\beta$, ethylenically unsaturated carboxylic acid such as zinc mono or diacrylate or methacrylate. To achieve higher coefficients of restitution in the core, the manufacturer may include fillers such as small amounts of a metal oxide such as zinc oxide. In addition, larger amounts of metal oxide than those that are needed to achieve the desired coefficient are often included in conventional cores in order to increase the core weight so that the finished ball more closely approaches the U.S.G.A. upper weight limit of 1.620 ounces. Other materials may be used in the core composition including compatible rubbers or ionomers, and low molecular weight fatty acids such as stearic acid. Free radical initiators such as peroxides are admixed with the core composition so that on the application of heat and pressure, a complex curing cross-linking reaction takes place.

The inner cover layer which is molded over the core is about 0.100 inches to about 0.010 inches in thickness, preferably about 0.0375 inches thick. The outer cover layer is about 0.010 inches to about 0.050 inches in thickness, preferably 0.0300 inches thick. Together, the core, the inner cover layer and the outer cover layer combine to form a ball having a diameter of 1.680 inches or more, the minimum diameter permitted by the rules of the United States Golf Association and weighing about 1.620 ounces.

Additional materials may be added to the cover compositions (both inner and outer cover layer) of the present invention including dyes (for example, Ultramarine Blue sold by Whitaker, Clark and Daniels of South Plainsfield, N.J.) (see U.S. Pat. No. 4,679,795); pigments such as titanium dioxide, zinc oxide, barium sulfate and zinc sulfate; and UV absorbers; antioxidants; antistatic agents; and stabilizers. Further, the cover compositions of the present invention may also contain softening agents, such as plasticizers, processing aids, etc. and reinforcing material such as glass fibers and inorganic fillers, as long as the desired properties produced by the golf ball covers are not impaired.

The various cover composition layers of the present invention may be produced according to conventional melt blending procedures. In the case of the outer cover layer, when a blend of hard and soft, low acid ionomer resins are utilized, the hard ionomer resins are blended with the soft ionomeric resins and with a masterbatch containing the desired additives in a Banbury mixer, two-roll mill, or extruder prior to molding. The blended composition is then formed into slabs and maintained in such a state until molding is desired. Alternatively, a simple dry blend of the pelletized or granulated resins and color masterbatch may be prepared and fed directly into the injection molding machine where homogenization occurs in the mixing section of the barrel prior to injection into the mold. If necessary, further additives such as an inorganic filler, etc., may be added and uniformly mixed before initiation of the molding process. A similar process is utilized to formulate the high acid ionomer resin compositions used to produce the inner cover layer.

The golf balls of the present invention can be produced by molding processes currently well known in the golf ball art. Specifically, the golf balls can be produced by injection molding or compression molding the inner cover layer about wound or solid molded cores to produce an intermediate golf ball having a diameter of about 1.50 to 1.67 inches, preferably about 1.620 inches. The outer layer is subsequently molded over the inner layer to produce a golf ball having a diameter of 1.680 inches or more. Although either solid cores or wound cores can be used in the present invention, as a result of their lower cost and superior performance, solid molded cores are preferred over wound cores.

In compression molding, the inner cover composition is formed via injection at about 380° F. to about 450° F. into smooth surfaced hemispherical shells which are then positioned around the core in a mold having the desired inner cover thickness and subjected to compression molding at 200° to 300° F. for about 2 to 10 minutes, followed by cooling at 50° to 70° F. for about 2 to 7 minutes to fuse the shells together to form a unitary intermediate ball. In addition, the intermediate balls may be produced by injection molding wherein the inner cover layer is injected directly around the core placed at the center of an intermediate ball mold for a period of time in a mold temperature of from 50° F. to about 100° F. Subsequently, the outer cover layer is molded about the core and the inner layer by similar compression or injection molding techniques to form a dimpled golf ball of a diameter of 1.680 inches or more.

After molding, the golf balls produced may undergo various further processing steps such as buffing, painting and marking as disclosed in U.S. Pat. No. 4,911,451.

The resulting golf ball produced from the high acid ionomer resin inner layer and the relatively softer, low flexural modulus outer layer provide for an improved multi-layer golf ball which provides for desirable coefficient of restitution and durability properties while at the same time offering the feel and spin characteristics associated with soft balata and balata-like covers of the prior art.

The present invention is further illustrated by the following examples in which the parts of the specific ingredients are by weight. It is to be understood that the present invention is not limited to the examples, and various changes and modifications may be made in the invention without departing from the spirit and scope thereof.

EXAMPLES

Several intermediate balls (cores plus inner cover layers) were prepared in accordance with conventional molding procedures described above. The inner cover compositions were molded around 1.545 inch diameter cores weighing 36.5 grams such that the inner cover had a wall thickness of about 0.0675 inches, with the overall ball measuring about 1.680 inches in diameter.

The cores utilized in the examples were comprised of the following ingredients: high cis-polybutadiene, zinc diacrylate, zinc oxide, zinc stearate, peroxide, calcium carbonate, etc. The molded cores exhibited Riehle compressions of about 60 and C.O.R. values of about 0.800. A representative formulation of the molded cores is set forth below:

| MATERIAL | WEIGHT |
| --- | --- |
| BR-1220 (high cis-polybutadiene) | 70.70 |
| Taktene 220 (high cis-polybutadiene) | 29.30 |
| React Rite ZDA (zinc diacrylate) | 31.14 |
| Zinc Oxide | 6.23 |
| Zinc Stearate | 20.15 |
| Limestone | 17.58 |
| Ground Flash (20-40 Mesh) | 20.15 |
| Blue Masterbatch | .012 |
| Luperco 231XL or Trigonox 29/40 | .89 |
| Papi 94 | .50 |

[1]Blue Masterbatch consists of unknown compositions used only for internal identification purposes and has no effect on physical properties.

The inner cover compositions designated herein as compositions A–E utilized to formulate the intermediate balls are set forth in Table 7 below. The resulting molded intermediate balls were tested to determine the individual compression (Riehle), C.O.R., Shore C hardness, spin rate and cut resistance properties. These results are also set forth in Table 7 below.

The data of these examples are the average of twelve intermediate balls produced for each example. The properties were measured according to the following parameters:

Coefficient of restitution (C.O.R.) was measured by firing the resulting golf ball in an air canon at a velocity of 125 feet per second against a steel plate positioned 12 feet from the muzzle of the canon. The rebound velocity was then measured. The rebound velocity was divided by the forward velocity to give a coefficient of restitution.

Shore hardness was measured in accordance with ASTM test 2240.

Cut resistance was measured in accordance with the following procedure: A golf ball is fired at 135 feet per second against the leading edge of a pitching wedge wherein the leading edge radius is 1/32 inch, the loft angle is 51 degrees, the sole radius is 2.5 inches and the bounce angle is 7 degrees.

The cut resistance of the balls tested herein was evaluated on a scale of 1 to 5. The number 1 represents a cut that extends completely through the cover to the core. A 2 represents a cut that does not extend completely through the cover but that does break the surface. A 3 does not break the surface of the cover but does leave a permanent dent. A 4 leaves only a slight crease which is permanent but not as severe as 3. A 5 represents virtually no visible indentation or damage of any sort.

The spin rate of the golf ball was measured by striking the resulting golf balls with a pitching wedge or 9 iron wherein the club head speed is about 105 feet per second and the ball is launched at an angle of 26 to 34 degrees with an initial velocity of about 110 to 115 feet per second. The spin rate was measured by observing the rotation of the ball in flight using stop action Strobe photography.

Initial velocity is the velocity of a ball when struck at a hammer speed of 143.8 feet per second in accordance with a test as prescribed by the U.S.G.A.

As will be noted, compositions A, B and C include high acid ionomeric resins, with composition B further including zinc stearate. Composition D represents the inner layer (i.e. Surlyn 1605) used in U.S. Pat. No. 4,431,193. Composition E provides a hard, low acid ionomeric resin.

The purpose behind producing and testing the balls of Table IV was to provide a subsequent comparison in properties with the multi-layer golf balls of the present invention.

TABLE 7

Molded Intermediate Golf Balls

|  | A | B | C | D | E |
|---|---|---|---|---|---|
| Ingredients of Inner Cover Compositions |  |  |  |  |  |
| Iotek 959 | 50 | 50 | — | — | — |
| Iotek 960 | 50 | 50 | — | — | — |
| Zinc Stearate | — | 50 | — | — | — |
| Surlyn 8162 | — | — | 75 | — | — |
| Surlyn 8422 | — | — | 25 | — | — |
| Surlyn 1605 | — | — | — | 100 | — |
| Iotek 7030 | — | — | — | — | 50 |
| Iotek 8000 | — | — | — | — | 50 |
| Properties of Molded Intermediate Balls |  |  |  |  |  |
| Compression | 58 | 58 | 60 | 63 | 62 |
| C.O.R. | .811 | .810 | .807 | .793 | .801 |
| Shore C Hardness | 98 | 98 | 97 | 96 | 96 |
| Spin Rate (R.P.M.) | 7,367 | 6,250 | 7,903 | 8,337 | 7,956 |
| Cut Resistance | 4–5 | 4–5 | 4–5 | 4–5 | 4–5 |

As shown in Table 7 above, the high acid ionomer resin inner cover layer (molded intermediate balls A–C) have lower spin rates and exhibit substantially higher resiliency characteristics than the low acid ionomer resin based inner cover layers of balls D and E.

Multi-layer balls in accordance with the present invention were then prepared. Specifically, the inner cover compositions used to produce intermediate golf balls from Table 7 were molded over the solid cores to a thickness of about 0.0375 inches, thus forming the inner layer. The diameter of the solid core with the inner layer measured about 1.620 inches. Alternatively, the intermediate golf balls of Table 7 were ground down using a centerless grinding machine to a size of 1.620 inches in diameter to produce an inner cover layer of 0.0375 inches.

The size of 1.620 inches was determined after attempting to mold the outer cover layer to various sizes (1.600", 1.610", 1.620", 1.630" and 1.640") of intermediate (core plus inner layer) balls. It was determined that 1.620" was about the largest "intermediate" ball (i.e., core plus inner layer) which could be easily molded over with the soft outer layer materials of choice. The goal herein was to use as thin an outer layer as necessary to achieve the desired playability characteristics while minimizing the cost of the more expensive outer materials. However, with a larger diameter final golf ball and/or if the cover is compression molded, a thinner cover becomes feasible.

With the above in mind, an outer cover layer composition was blended together in accordance with conventional blending techniques. The outer layer composition used for this portion of the example is a relatively soft cover composition such as those listed in U.S. Pat. No. 5,120,791. An example of such a soft cover composition is a 45% soft/55% hard low acid ionomer blend designated by the inventor as "TE-90". The composition of TE-90 is set forth as follows:

| Outer Cover Layer Composition TE-90 | |
|---|---|
| Iotek 8000 | 22.7 weight % |
| Iotek 7030 | 22.7 weight % |
| Iotek 7520 | 45.0 weight % |
| White MB[1] | 9.6 weight % |

[1]White MB consists of about 23.77 weight percent $TiO_2$; 0.22 weight percent Uvitex OB, 0.03 weight percent Santonox R, 0.05 weight percent Ultramarine blue and 75.85 weight percent Iotek 7030.

The above outer layer composition was molded around each of the 1.620 diameter intermediate balls comprising a core plus one of compositions A–D, respectively. In addition, for comparison purposes, Surlyn® 1855 (new Surlyn® 9020), the cover composition of the '193 patent, was molded about the inner layer of composition D (the intermediate ball representative of the '193 patent). The outer layer TE-90 was molded to a thickness of approximately 0.030 inches to produce a golf ball of approximately 1.680 inches in diameter. The resulting balls (a dozen balls for each example) were tested and the various properties thereof are set forth in Table 8 as follows:

TABLE 8

| | Finished Balls | | | | |
|---|---|---|---|---|---|
| | 1 | 2 | 3 | 4 | 5 |
| Ingredients: | | | | | |
| Inner Cover Composition | A | B | C | D | D |
| Outer Cover Composition | TE-90 | TE-90 | TE-90 | TE-90 | Surlyn ® 9020 |
| Properties of Molded Finished Balls: | | | | | |
| Compression | 63 | 63 | 69 | 70 | 61 |
| C.O.R. | .784 | .778 | .780 | .770 | .757 |
| Shore C Hardness | 88 | 88 | 88 | 88 | 89 |
| Spin (R.P.M.) | 8,825 | 8,854 | 8,814 | 8,990 | 8,846 |
| Cut Resistance | 3–4 | 3–4 | 3–4 | 3–4 | 1–2 |

As it will be noted in finished balls 1–4, by creating a multi-layer cover utilizing the high acid ionomer resins in the inner cover layer and the hard/soft low acid ionomer resin in the outer cover layer, higher compression and increased spin rates are noted over the single layer covers of Table 7. In addition, both the C.O.R. and the Shore C hardness are reduced over the respective single layer covers of Table IV. This was once again particularly true with respect to the multi-layered balls containing the high acid ionomer resin in the inner layer (i.e. finished balls 1–5). In addition, with the exception of prior art ball 5 (i.e. the '193 patent), resistance to cutting remains good but is slightly decreased. As note above, the prior art ball of the '193 patent suffers substantially in durability (as well as in resiliency) in comparison to the balls of the present invention.

Furthermore, it is also noted that the use of the high acid ionomer resins as the inner cover material produces a substantial increase in the finished balls overall distance properties. In this regard, the high acid ionomer resin inner covers of balls 1–3 produce an increase of approximately 10 points in C.O.R. over the low acid ionomer resin inner covers of balls 4 and about a 25 point increase over the prior art balls 5. Since an increase in 3 to 6 points in C.O.R. results in an average increase of about 1 yard in distance, such an improvement is deemed to be significant.

Several other outer layer formulations were prepared and tested by molding them around the core and inner cover layer combination to form balls each having a diameter of about 1.68 inches. First, B. F. Goodrich Estane® X-4517 polyester polyurethane was molded about the core molded with inner layer cover formulation A. DuPont Surlyn®9020 was molded about the core which was already molded with inner layer D. Similar properties tests were conducted on these golf balls and the results are set forth in Table VI below:

TABLE 9

|  | Finish Balls | |
| --- | --- | --- |
|  | 6 | 7 |
| Ingredients: | | |
| Inner Cover Layer Composition | A | D |
| Outer Cover Layer Coqosition | Estane ® 4517 | Surlyn ® 9020 |
| Properties of Molded Finished Balls: | | |
| Compression | 67 | 61 |
| C.O.R. | .774 | .757 |
| Shore C Hardness | 74 | 89 |
| Spin (R.P.M.) | 10,061 | 8,846 |
| Cut Resistance | 3–4 | 1–2 |

The ball comprising inner layer formulation D and Surlyn® 9020 identifies the ball in the Nesbitt U.S. Pat. No. 4,431,193 patent. As noted, the example provides for relatively high softness and spin rate though it suffers from poor cut resistance and low C.O.R. This ball is unacceptable by today's standards.

As for the Estanes X-4517 polyester polyurethane, a significant increase in spin rate over the TE-90 cover is noted along with an increased compression. However, the C.O.R. and Shore C values are reduced, while the cut resistance remains the same. Furthermore, both the Estane® X-4517 polyester polyurethane and the Surlyn® 9020 were relatively difficult to mold in such thin sections.

The invention has been described with reference to the preferred embodiment. Obviously, modifications and alterations will occur to others upon reading and understanding the proceeding detailed description. It is intended that the invention be construed as including all such modifications and alterations insofar as they come within the scope of the appended claims or the equivalents thereof.

I claim:
1. A golf ball comprising:
    a core;
    an inner cover layer molded on said core, said inner cover layer comprising a high acid ionomer including at least 16% by weight of an alpha, beta-unsaturated carboxylic acid; and
    an outer cover layer molded on said inner cover layer, said outer cover layer comprising a low flexural modulus ionomer resin which includes a blend of a hard high modulus ionomer with a soft low modulus ionomer, the high modulus ionomer being a sodium, zinc, magnesium or lithium salt of a copolymer having from 2 to 8 carbon atoms and an unsaturated monocarboxylic acid having from 3 to 8 carbon atoms, the low modulus ionomer being a sodium or zinc salt of a terpolymer of an olefin having 2 to 8 carbon atoms, acrylic acid and an unsaturated monomer of the acrylate ester class having from 1 to 21 carbon atoms.

2. A golf ball according to claim 1 wherein the inner cover layer comprises a high acid ionomer resin comprising a copolymer of about 17% to about 25% by weight of an alpha, beta-unsaturated carboxylic acid.

3. A golf ball according to claim 1 wherein the inner cover layer comprises a high acid ionomer resin comprising a copolymer of about 18.5% to about 21.5% by weight of an alpha, beta-unsaturated carboxylic acid.

4. A golf ball according to claim 1, wherein the inner cover layer has a thickness of about 0.100 to about 0.010 inches and the outer cover layer has a thickness of about 0.010 to about 0.05 inches, the golf ball having an overall diameter of 1.680 inches or more.

5. A golf ball according to claim 1 wherein the inner cover layer has a thickness of about 0.0375 inches and the outer cover layer has a thickness of about 0.0300 inches, the golf ball having an overall diameter of 1,680 inches or more.

6. A golf ball according to claim 1 wherein the outer layer composition includes 90 to 10 percent by weight of the hard high modulus ionomer resin and about 10 to 90 percent by weight of the soft low modulus ionomer resin.

7. A golf ball according to claim 1 wherein the outer layer composition includes 75 to 25 percent by weight of the hard high modulus ionomer resin and about 25 to 75 percent by weight of the soft low modulus ionomer resin.

8. A multi-layer golf ball comprising:
    a spherical core;
    an inner cover layer molded over said spherical core to form a spherical intermediate ball, said inner cover layer comprising an ionomeric resin including at lesat 16% by weight of an alpha, beta-unsaturated carboxylic acid and having a modulus of from about 15,000 to about 70,000 psi;
    an outer cover layer molded over said spherical intermediate ball to form a multi-layer golf ball, the outer layer comprising a blend of i) a sodium or zinc salt of a copolymer having from 2 to 8 carbon atoms and an unsaturated monocarboxylic acid having from 3 to 8 carbon atoms, and ii) a sodium or zinc salt of a terpolymer of an olefin having from 2 to 8 carbon atoms, acrylic acid and an unsaturated monomer of the acrylate ester class having from 1 to 21 carbon atoms, said outer cover layer having a modulus in a range of about 1,000 to about 30,000 psi.

9. A multi-layer golf ball comprising:

a spherical core;

an inner cover layer molded over said spherical core to form a spherical intermediate ball, said inner cover layer comprising an ionomeric resin including about 17% to about 25% by weight of an alpha, beta-unsaturated carboxylic acid and having a modulus of from about 15,000 to about 70,000 psi;

an outer cover layer molded over said spherical intermediate ball to form a multi-layer golf ball, the outer comprising a non-ionomeric thermoplastic selected from the group consisting of polyester elastomer, polyester polyurethane and polyester amide, said outer cover layer having a modulus in a range of about 1,000 to about 30,000 psi.

10. A golf ball comprising;

a solid polybutadiene core;

an inner cover layer molded on said core, the inner cover layer comprising a high acid ionomer including at least 16% by weight of an alpha, beta-unsaturated carboxylic acid, wherein said core with said inner cover layer molded thereon comprise an intermediate ball, and said intermediate ball has a coefficient of restitution of greater than 0.801; and an outer cover layer molded on said inner cover layer, said outer cover layer comprising a relatively soft polymeric material selected from the group consisting of low flexural modulus ionomer resins and non-ionomeric elastomers.

11. The golf ball according to claim 10, wherein said non-ionomeric elastomer is a polyurethane.

12. A golf ball according to claim 10, wherein said golf ball has a coefficient of restitution of at least 0.770.

13. A golf ball according to claim 10, wherein said outer cover layer has a Shore C hardness of about 74.

14. A golf ball according to claim 10, wherein said outer cover is about 0,030 inches in thickness.

* * * * *

US006623381C1

(12) INTER PARTES REEXAMINATION CERTIFICATE (0400th)
United States Patent
Sullivan

(10) Number: US 6,623,381 C1
(45) Certificate Issued: *Jul. 3, 2012

(54) MULTI-LAYER GOLF BALL

(75) Inventor: Michael J. Sullivan, Barrington, RI (US)

(73) Assignee: Callaway Golf Company, Carlsbad, CA (US)

Reexamination Request:
No. 95/000,444, Mar. 3, 2009

Reexamination Certificate for:
Patent No.: 6,623,381
Issued: Sep. 23, 2003
Appl. No.: 10/080,266
Filed: Feb. 21, 2002

(*) Notice: This patent is subject to a terminal disclaimer.

Related U.S. Application Data

(63) Continuation of application No. 08/714,661, filed on Sep. 16, 1996, now Pat. No. 6,368,237, which is a division of application No. 08/562,540, filed on Nov. 20, 1995, now abandoned, which is a continuation of application No. 08/070,510, filed on Jun. 1, 1993, now abandoned.

(51) Int. Cl.
*A63B 37/12* (2006.01)

(52) U.S. Cl. ........................................................ 473/374
(58) Field of Classification Search .................... None
See application file for complete search history.

(56) References Cited

To view the complete listing of prior art documents cited during the proceeding for Reexamination Control Number 95/000,444, please refer to the USPTO's public Patent Application Information Retrieval (PAIR) system under the Display References tab.

*Primary Examiner* — Jeffrey L. Gellner

(57) ABSTRACT

The present invention is directed to an improved multi-layer golf ball comprising a core, an inner cover layer and an outer cover layer. The inner cover layer is comprised of a high acid ionomer or ionomer blend which may or may not include a filler such as zinc-stearate. The outer cover layer is comprised of a soft, very low modulus ionomer or ionomer blend, or a non-ionomeric thermoplastic elastomer such as polyurethane, polyester or polyesteramide. The resulting multi-layered golf ball of the present invention provides for enhanced distance without sacrificing playability or durability when compared to known multi-layer golf balls.

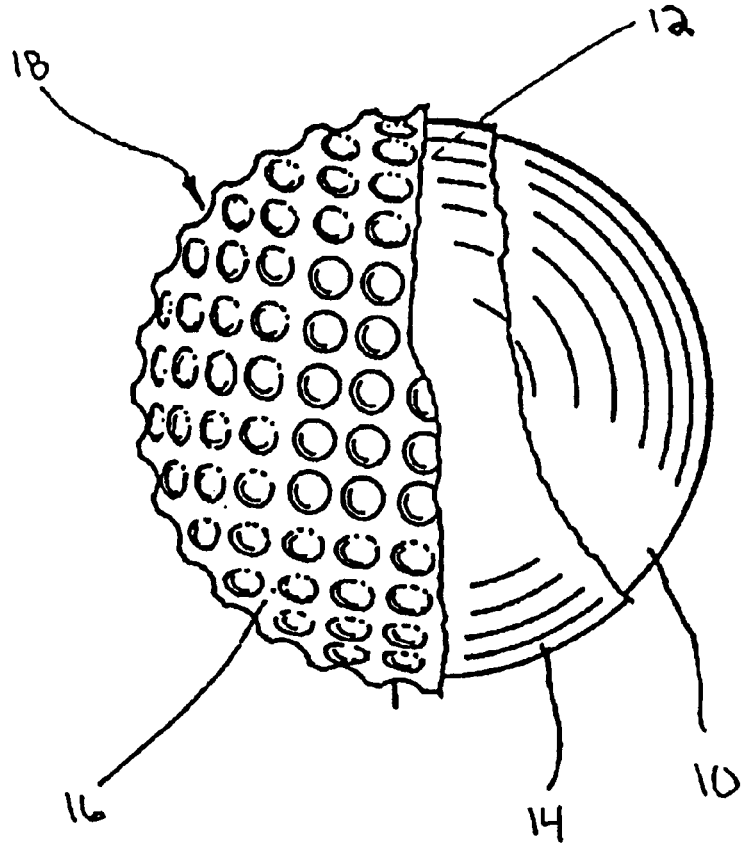

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-14 are cancelled.

* * * * *